(12) United States Patent
Maeda

(10) Patent No.: US 11,150,968 B2
(45) Date of Patent: Oct. 19, 2021

(54) INFORMATION PROCESSING APPARATUS, CONTROL METHOD OF INFORMATION PROCESSING, AND NON-TRANSITORY COMPUTER-READABLE STORAGE MEDIUM FOR STORING PROGRAM

(71) Applicant: FUJITSU LIMITED, Kawasaki (JP)

(72) Inventor: Munenori Maeda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/554,671

(22) Filed: Aug. 29, 2019

(65) Prior Publication Data
US 2019/0384658 A1    Dec. 19, 2019

Related U.S. Application Data

(63) Continuation of application No. PCT/JP2018/005793, filed on Feb. 19, 2018.

(30) Foreign Application Priority Data

Mar. 2, 2017  (JP) .............................. JP2017-039090

(51) Int. Cl.
*G06F 9/54* (2006.01)
*G06F 12/0842* (2016.01)

(52) U.S. Cl.
CPC .......... *G06F 9/544* (2013.01); *G06F 12/0842* (2013.01); *G06F 2212/1016* (2013.01)

(58) Field of Classification Search
None
See application file for complete search history.

(56) References Cited

U.S. PATENT DOCUMENTS 5,771,383 A * 6/1998 Magee .................... G06F 9/544
718/100
7,356,666 B2 * 4/2008 Kanai .................... G06F 9/5016
709/212

(Continued)

FOREIGN PATENT DOCUMENTS

JP  2002-108698  4/2002
JP  2009-026081  2/2009

(Continued)

OTHER PUBLICATIONS

International Search Report, mailed in connection with PCT/JP2018/005793 and dated May 15, 2018 (1 page).

*Primary Examiner* — Umut Onat
(74) *Attorney, Agent, or Firm* — Fujitsu Patent Center

(57) ABSTRACT

An apparatus includes: a first memory configured to store thread information to be used in thread execution; a second memory configured to store the thread information saved from the first memory; and a processor configured to execute allocation processing. In an example, the allocation processing includes: judging based on an instruction to generate a thread whether the first memory has an empty area to store the thread information of the thread; allocating the empty area to the thread information of the thread when the first memory has the empty area; and generating identification information in response that the thread is generated, by using a first index and discrimination information, the first index being an index for identifying the thread information stored in the first memory, the discrimination information being information for discriminating the thread information stored in the first memory from the thread information saved to the second memory.

8 Claims, 12 Drawing Sheets

(56) References Cited

U.S. PATENT DOCUMENTS

| | | | |
|---|---|---|---|
| 7,739,457 B2* | 6/2010 | Kanai | G06F 9/544 |
| | | | 711/148 |
| 8,341,357 B2* | 12/2012 | Karlsson | G06F 9/3885 |
| | | | 711/137 |
| 2007/0277001 A1* | 11/2007 | Mevergnies | G06F 12/084 |
| | | | 711/145 |
| 2009/0024818 A1 | 1/2009 | Yamada et al. | |
| 2011/0231612 A1* | 9/2011 | Karlsson | G06F 12/0862 |
| | | | 711/119 |
| 2013/0031310 A1 | 1/2013 | Morita et al. | |
| 2014/0115601 A1* | 4/2014 | Suzuki | G06F 9/5088 |
| | | | 718/104 |
| 2014/0201402 A1 | 7/2014 | Dalal et al. | |
| 2016/0364158 A1* | 12/2016 | Narayanan | G06F 3/067 |
| 2017/0132132 A1* | 5/2017 | Gschwind | G06F 12/084 |

FOREIGN PATENT DOCUMENTS

| | | |
|---|---|---|
| JP | 2011-242896 | 12/2011 |
| JP | 2014-130401 | 7/2014 |
| JP | 2016-503934 | 2/2016 |
| WO | 2014/113063 | 7/2014 |

\* cited by examiner

Δ: SAVING EXTRA TIME
ε: TIME WIDTH
Δ/ε: BUFFER SIZE
i: STORAGE LOCATION POINTER OF CLST (GLOBAL VARIABLE)

INFORMATION PROCESSING APPARATUS, CONTROL METHOD OF INFORMATION PROCESSING, AND NON-TRANSITORY COMPUTER-READABLE STORAGE MEDIUM FOR STORING PROGRAM

CROSS-REFERENCE TO RELATED APPLICATION

This application is a continuation application of International Application PCT/JP2018/005793 filed on Feb. 19, 2018 and designated the U.S., the entire contents of which are incorporated herein by reference. The International Application PCT/JP2018/005793 is based upon and claims the benefit of priority of the prior Japanese Patent Application No. 2017-039090, filed on Mar. 2, 2017, the entire contents of which are incorporated herein by reference.

FIELD

The embodiments discussed herein are related to an information processing apparatus, a control method of the information processing, and a non-transitory computer-readable storage medium for storing a program.

BACKGROUND

An information processing apparatus performs processing such as computing, using a storage device such as a memory. When executing an application program or the like, the information processing apparatus reserves a memory area to be used in performing the processing. Then, the memory area which becomes unnecessary due to the end or the like of the processing is freed. Note that the occurrence of a memory leak, in which the unnecessary memory area is continuously reserved without being freed, lowers utilization efficiency of the memory area because the unnecessary memory area is continuously reserved in the storage device. In addition, frequent occurrences of memory leaks decrease usable memory areas, and may make it impossible to reserve a memory area required to perform the processing. In this case, the application program abnormally terminates. Alternatively, an entire system including the application program may abnormally terminate.

Accordingly, a method of suppressing occurrence of a memory leak is proposed. For example, a method of generating a program that suppresses the occurrence of the memory leak is proposed for a program generator that generates a multithread program causing an information processing apparatus to execute parallel processing by using multiple threads (see, for example, Japanese Laid-open Patent Publication No. 2014-130401). This type of program generator analyzes a code describing a thread that dynamically reserves a memory area, of codes describing the multithread program. Then, if the thread does not free the memory area before termination, the program generator corrects the program such that the thread is terminated after the unfreed memory area is forcibly freed. Note that a code describing a thread which reserves a memory area to be possibly used by a parent process, another thread, or the like is excluded from the codes to be analyzed.

In addition, a memory management system is proposed that frees any unnecessary memory area without mistakenly freeing a memory area to be used by a process (see, for example, Japanese Laid-open Patent Publication No. 2002-108698). This type of memory management system manages maximum life time of the memory area reserved by the process, and, after reserving a memory area, frees the memory area that is not freed even after the maximum life time expires.

In addition, a memory management method is proposed that extracts a leak object which is likely to have the memory leak, based on access information on an object generated by program execution (see, for example, Japanese Laid-open Patent Publication No. 2009-26081). In this type of memory management method, the leak object extracted based on the access information is moved from a main memory to an auxiliary memory. Here, if the object stored in the auxiliary memory is accessed, the processor running the program moves the accessed object to the main memory.

SUMMARY

According to an aspect of the embodiments, an information processing apparatus includes: a first memory configured to store thread information to be used in thread execution; a second memory configured to store the thread information saved from the first memory; and a processor configured to (i) execute an execution processing that includes executing a thread, (ii) execute a saving processing that includes saving the thread information of a saving target thread from the first memory to the second memory after execution of the saving target thread completes, the saving target thread being any of threads to be executed by the execution processing, and (iii) execute an information transfer processing that includes transferring the thread information to be used by an execution target thread from the second memory to the execution processing, if the execution target thread uses the thread information saved to the second memory.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

There are some cases in which data such as a return value of a preceding thread is used in a following thread. The data such as the return value of the preceding thread is stored in a memory area reserved for execution of the preceding thread. For this reason, a memory leak may occur in an information processing apparatus that does not free the memory area in preparation for use of the data by the following thread even after the preceding thread terminates.

In one aspect, an object of the disclosure is to suppress occurrence of a memory leak.

Hereinafter, embodiments are described with reference to the drawings.

Figure 1:
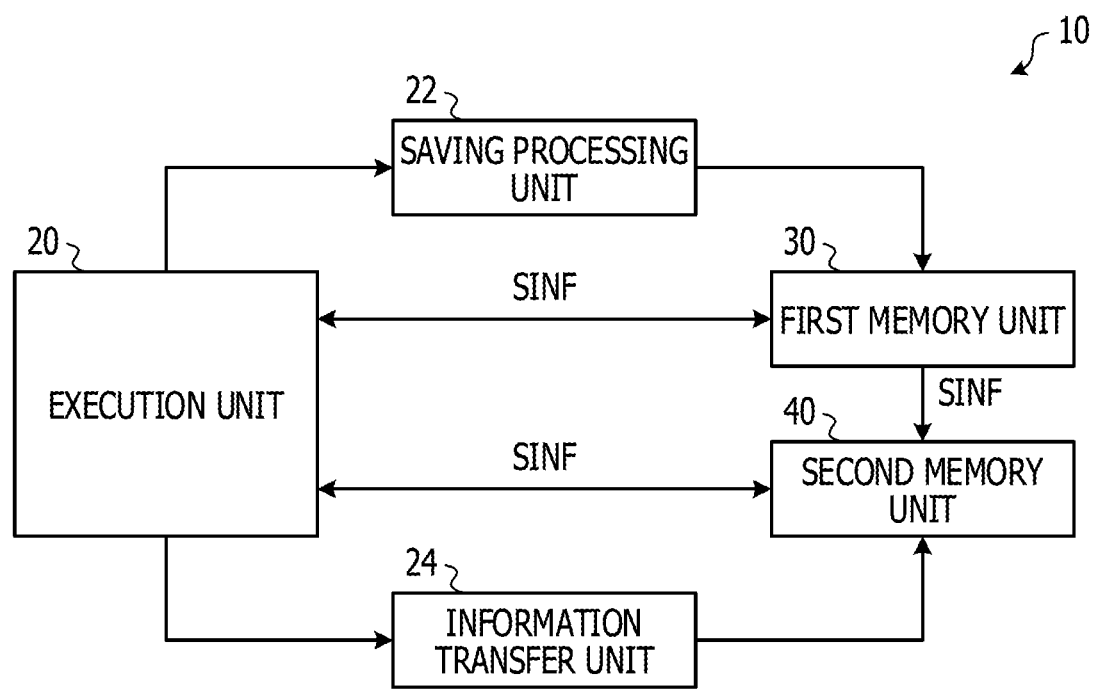
FIG. 1 is a diagram illustrating an embodiment of an information processing apparatus.

FIG. 1 illustrates an embodiment of an information processing apparatus. The information processing apparatus 10 illustrated in FIG. 1 is a computer device such as a server, or the like, and executes a program written using a thread library that provides functions such as thread generation. For example, the information processing apparatus 10 includes an execution unit 20, a saving processing unit 22, an information transfer unit 24, a first memory unit 30 configured to store thread information SINF, and a second memory unit 40 configured to store the thread information SINF to be saved from the first memory unit 30. Note that the thread information SINF is information to be used in thread execution. For example, the thread information SINF is a return value of the thread, or the like. Respective functions of the execution unit 20, the saving processing unit 22, and the information transfer unit 24 are implemented, for example, by the information processing apparatus 10 executing software such as a control program. More specifically, the execution unit 20, the saving processing unit 22, and the information transfer unit 24 are implemented by control of hardware with the software. Note that the execution unit 20, the saving processing unit 22, and the information transfer unit 24 may be implemented only by the hardware. In addition, for example, the first memory unit 30 is a semiconductor storage such as a dynamic random access memory (DRAM). The second memory unit 40 is a hard disk device, a solid state drive (SSD), or the like.

The execution unit 20 executes the thread based on the program. Then, when processing of the thread terminates, the execution unit 20 stores the return value of the thread or the like in a memory area allocated corresponding to the thread, of memory areas of the first memory unit 30. For example, before the execution unit 20 starts to execute a new thread, the information processing apparatus 10 reserves in the first memory unit 30 a memory area to store the thread information SINF of the new thread.

In addition, if the thread being executed uses the thread information SINF such as the return value of the other thread or the like, the execution unit 20 acquires from the first memory unit 30 the thread information SINF stored in the memory area allocated to the other thread to continue to execute the thread. Note that if processing of the other thread does not terminate, the execution unit 20 waits for acquisition of the thread information SINF of the other thread till the processing of the other thread terminates. The memory area allocated to the other thread is freed if the thread information SINF is transferred to the following thread. The freed memory area may be allocated to a new thread.

The saving processing unit 22 identifies a memory area that remains unfreed and is reserved in the first memory unit 30 even when a predetermined period of time elapses after the processing of the thread terminates. The saving processing unit 22 determines a thread allocated to the identified memory area as a saving target thread. More specifically, the saving processing unit 22 determines, as the saving target thread, any thread, the thread information SINF of which is not used before the predetermined period of time elapses after the processing of the thread terminates.

Then, the saving processing unit 22 moves the thread information SINF of the saving target thread from the first memory unit 30 to the second memory unit 40. This frees the memory area allocated to the saving target thread, allowing for allocation of the memory area to a new thread. As a result, the occurrence of the memory leak may be suppressed, the memory leak continuing to reserve an unnecessary memory area in the first memory unit 30 without freeing the memory area.

In addition, the saving processing unit 22 may determine the saving target thread based on an address that indicates a storage location of a leading instruction of a function to be first executed in the thread. For example, the saving processing unit 22 may determine as the saving target thread a thread in which a function starting with a storage location address of an instruction specified in advance is first executed. Alternatively, the saving processing unit 22 may determine the saving target thread based on an address that indicates a storage location of an instruction to generate the thread. For example, a user who develops software such as a program using the information processing apparatus 10 may specify in advance an address that indicates a storage location of an instruction to generate a debug target thread. In this case, the saving processing unit 22 may select the debug target thread as the saving target thread. In addition, the saving processing unit 22 may determine, as a saving target thread, a thread whose thread attributes includes such an attribute that the thread information SINF is to be saved after the processing of the thread terminates.

If the saving processing unit 22 identifies the saving target thread before the processing of the thread terminates, the saving processing unit 22 may save the thread information SINF of the saving target thread from the first memory unit 30 to the second memory unit 40 without waiting for the predetermined period of time after the saving target thread terminates. In this manner, of the threads executed by the execution unit 20, the saving processing unit 22 saves the thread information SINF of the saving target thread that saves the thread information SINF, from the first memory unit 30 to the second memory unit 40 after the saving target thread terminates.

Note that if the thread information SINF of the other thread to be used by the thread being executed is already saved in the second memory unit 40, the execution unit 20 requests the information transfer unit 24 to acquire the thread information SINF and receives the thread information SINF from the second memory unit 40.

When receiving the request for acquisition of the thread information SINF from the execution unit 20, the information transfer unit 24 transfers the requested thread information SINF from the second memory unit 40 to the execution unit 20. More specifically, when the thread being executed uses the thread information SINF saved in the second memory unit 40, the information transfer unit 24 transfers the thread information SINF to be used by the thread being executed, from the second memory unit 40 to the execution unit 20. In this manner, even if the thread information SINF saved from the first memory unit 30 to the second memory unit 40 is used in the following thread, the thread information SINF may be transferred to the following thread. As a result, abnormal termination of the following thread without being able to use the thread information SINF may be avoided.

The second memory unit 40 frees the memory area where the thread information SINF transferred to the execution unit 20 is stored. Note that, for example, in a case where the debug target thread is selected as the saving target thread, the second memory unit 40 may continue to reserve the memory area where the thread information SINF transferred to the execution unit 20 is stored, without freeing the memory area. For example, if the second memory unit 40 does not free the memory area where the thread information SINF transferred from the second memory unit 40 to the execution unit 20 is stored, the user may access to the thread information SINF saved in the second memory unit 40 after the thread terminates, when performing program analysis or the like.

Note that a configuration of the information processing apparatus 10 is not limited to the example illustrated in FIG. 1. For example, the first memory unit 30 and the second memory unit 40 may be respectively allocated to different memory areas in a same semiconductor storage. In this case, after making data size of the thread information SINF of the saving target thread smaller by compression or the like, the saving processing unit 22 may move the thread information SINF to the second memory unit 40.

Figure 2:
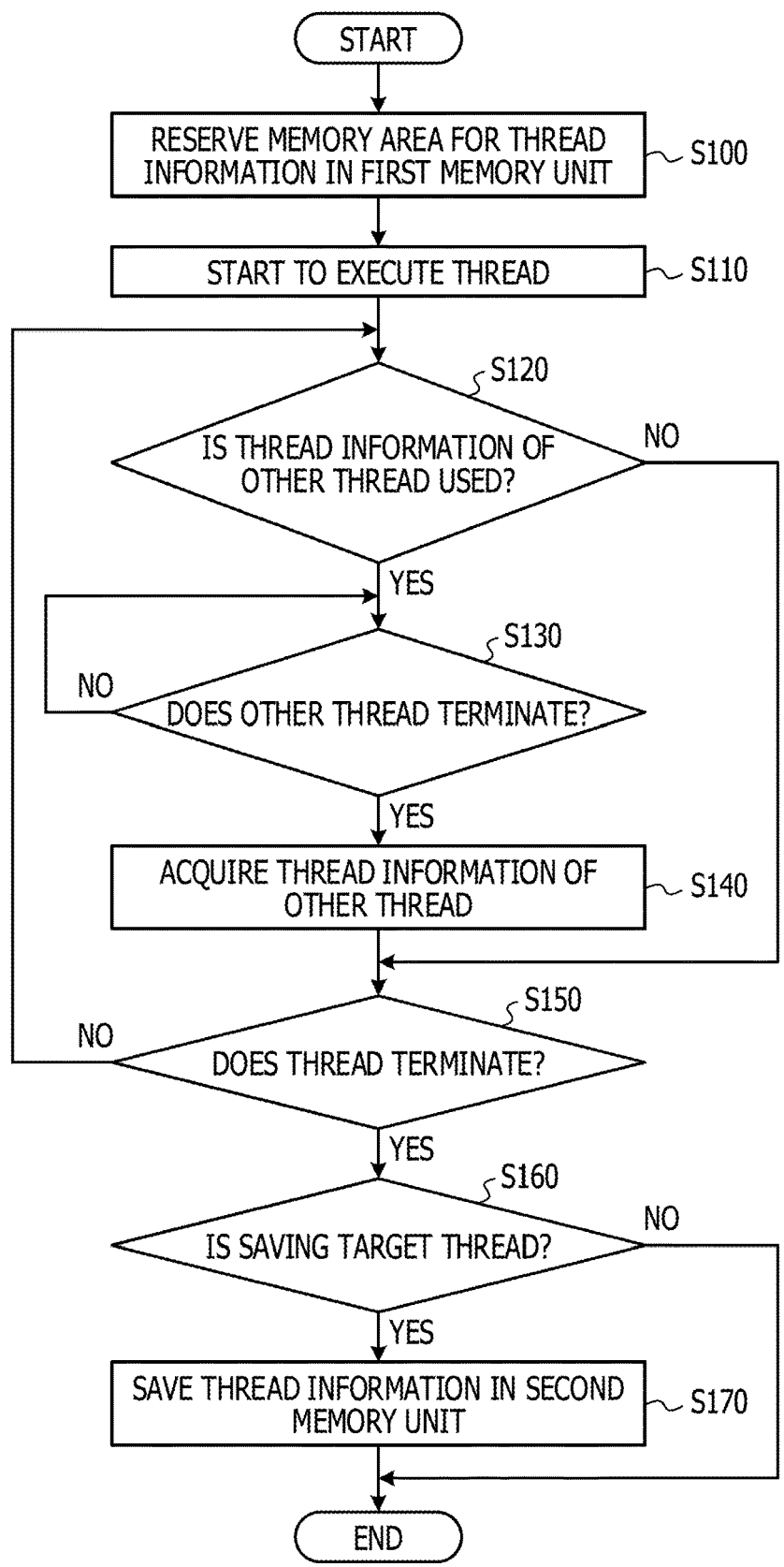
FIG. 2 is a diagram illustrating an example of operations of the information processing apparatus illustrated in FIG. 1.

FIG. 2 illustrates an example of operations of the information processing apparatus 10 illustrated in FIG. 1. Note that the operations illustrated in FIG. 2 are each an aspect of a control method of an information processing apparatus and a control program of the information processing apparatus. For example, the operations illustrated in FIG. 2 may be implemented only by the hardware or may be implemented by control of the hardware with the software such as the control program. More specifically, the information processing apparatus controlled by the control program may perform the operations illustrated in FIG. 2. Note that the operations illustrated in FIG. 2 are the operations of the information processing apparatus 10 in a case where focus is placed on one thread (also referred to as a processing target thread). The information processing apparatus 10 may perform multiple threads in parallel. Therefore, the information processing apparatus 10 may perform the operations illustrated in FIG. 2 in parallel. For example, the information processing apparatus 10 executes the operations illustrated in FIG. 2 every time the information processing apparatus 10 calls a function to generate a thread.

In step S100, the information processing apparatus 10 reserves in the first memory unit 30 a memory area to store the thread information SINF of the processing target thread.

Then, in step S110, the execution unit 20 of the information processing apparatus 10 starts to execute the processing target thread.

Then, in step S120, the execution unit 20 judges whether or not the processing target thread uses the thread information SINF of the other thread. If the processing target thread uses the thread information SINF of the other thread, the operation of the execution 20 proceeds to step S130. On the other hand, if the processing target thread does not use the thread information SINF of the other thread, the operation of the execution unit 20 proceeds to step S150.

In step S130, the execution unit 20 judges whether or not the other thread terminates. If the other thread terminates, the operation of the execution unit 20 proceeds to step S140. On the other hand, if the other thread does not terminate, the operation of the execution unit 20 returns to step S130. More specifically, if the other thread does not terminate, the execution unit 20 waits for the processing of the processing target thread till the other thread terminates.

In step S140, the execution unit 20 acquires the thread information SINF of the other thread. For example, if the thread information SINF of the other thread is stored in the first memory unit 30, the execution unit 20 acquires the thread information SINF of the other thread from the first memory unit 30 and frees the memory area allocated to the other thread.

In addition, if the thread information SINF of the other thread is saved in the second memory unit 40, the execution unit 20 requests the information transfer unit 24 of the information processing apparatus 10 to acquire the thread information SINF of the other thread. Then, the information transfer unit 24 retrieves the thread information SINF requested by the execution unit 20 from the second memory unit 40 and transfers the thread information SINF to the execution unit 20. With this, the execution unit 20 acquires the thread information SINF of the other thread from the second memory unit 40. After the processing of step S140 is performed, the operation of the execution 20 proceeds to step S150.

In step S150, the execution unit 20 judges whether or not the processing target thread terminates. If the processing target thread terminates, the operation of the information processing apparatus 10 proceeds to step S160. On the other hand, if the processing target thread does not terminate, the operation of the information processing apparatus 10 returns to step S120.

In step S160, the saving processing unit 22 of the information processing apparatus 10 judges whether or not the processing target thread is the saving target thread. For example, if the thread information SINF of the processing target thread is not used in the following thread even when the predetermined period of time elapses after the processing target thread terminates, the saving processing unit 22 judges that the processing target thread is the saving target thread. In this case, the saving processing unit 22 selects the processing target thread as the saving target thread. In other words, the processing target thread is not selected as the saving target thread if the thread information SINF thereof is used in the following thread before the predetermined period of time elapses after the processing of the processing target thread terminates.

If the processing target thread is the saving target thread, the operation of the information processing apparatus 10 proceeds to step S170. On the other hand, the processing target thread is not the saving target thread, the operation of the information processing apparatus 10 on the processing target thread terminates.

In step S170, the saving processing unit 22 saves the thread information SINF of the processing target thread, that is, the thread information SINF of the saving target thread, from the first memory unit 30 to the second memory unit 40. This allows the memory area in the first memory unit 30 allocated to the processing target thread to be freed and may suppress the occurrence of the memory leak. When the processing of step S170 terminates, the operation of the information processing apparatus 10 on the processing target thread terminates.

Note that the operations of the information processing apparatus 10 are not limited to the example illustrated in FIG. 2. For example, the saving processing unit 22 may judge whether or not the processing target thread is the saving target thread, based on a type of the function to be first executed in the processing target thread or may judge based on the address that indicates the storage location of the instruction to generate the processing target thread. Alternatively, the saving processing unit 22 may judge based on the attribute of the processing target thread, or the like, whether or not the processing target thread is the saving target thread.

As described above, in the embodiment illustrated in FIGS. 1 and 2, the information processing apparatus 10 includes the first memory unit 30 and the second memory unit 40, the first memory unit 30 configured to store the thread information SINF to be used in the thread execution and the second memory unit 40 configured to store the thread information SINF saved from the first memory unit 30. Furthermore, the information processing apparatus 10 includes the execution unit 20 configured to execute a thread, the saving processing unit 22, and the information transfer unit 24. The saving processing unit 22 finds a saving target thread the thread information SINF of which is to be saved among from the threads to be executed by the execution unit 20, and saves the thread information SINF of the saving target thread from the first memory unit 30 to the second memory unit 40 after the saving target thread terminates. This makes it possible to free the memory area in the first memory unit 30 allocated to the saving target thread and suppress the occurrence of the memory leak.

In addition, if the thread being executed uses the thread information SINF saved in the second memory unit 40, the information transfer unit 24 transfers the thread information SINF to be used by the thread being executed from the second memory unit 40 to the execution unit 20. With this, even if the thread information SINF saved from the first memory unit 30 to the second memory unit 40 is used in the following thread, the thread information SINF may be transferred to the following thread. As a result, abnormal termination of the following thread without being able to use the thread information SINF may be avoided.

Figure 3:
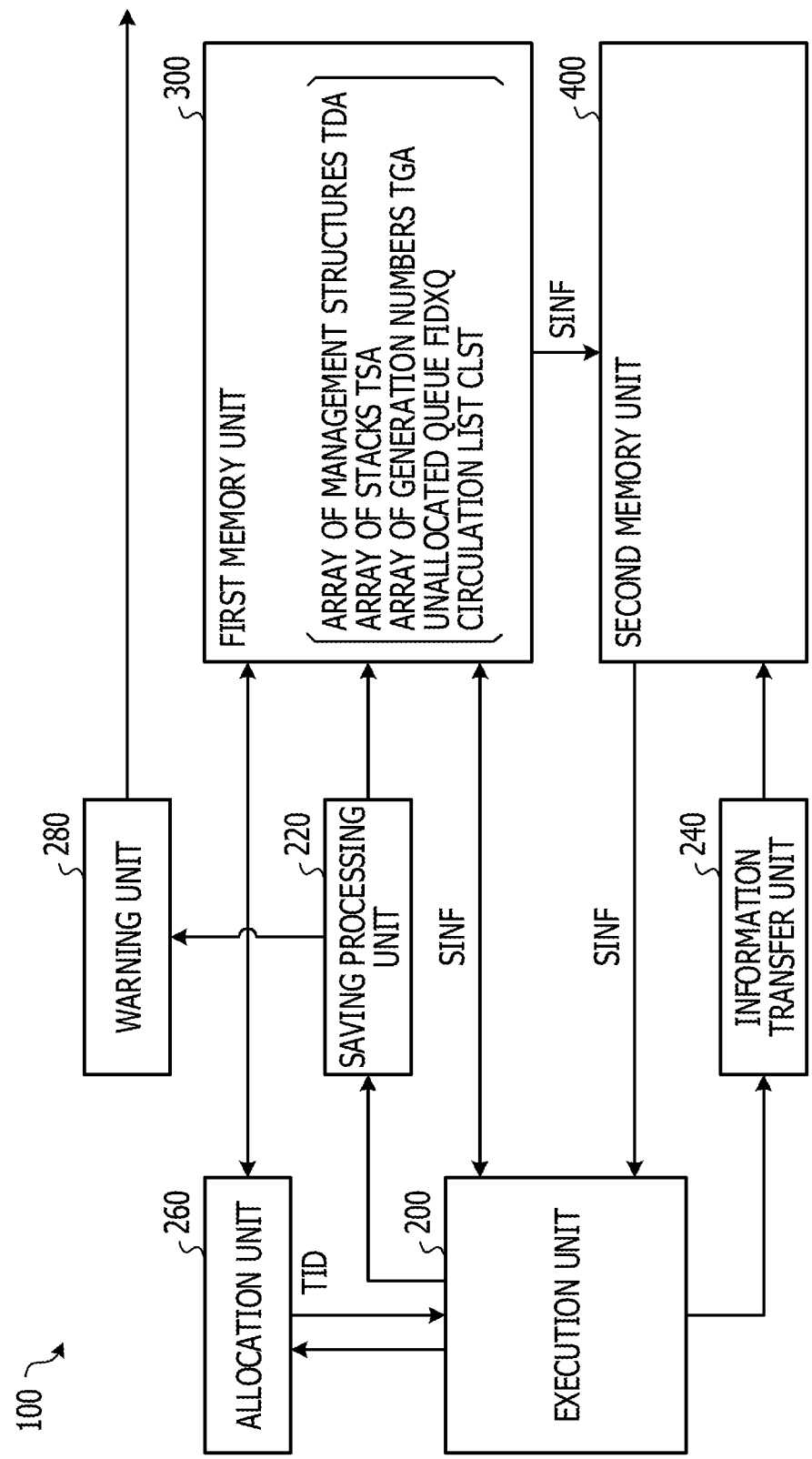
FIG. 3 is a diagram illustrating another embodiment of the information processing apparatus.

FIG. 3 illustrates another embodiment of the information processing apparatus. Elements identical or similar to the elements described in FIG. 1 are assigned identical or similar reference numerals and a detailed description of the elements is omitted. An information processing apparatus 100 illustrated in FIG. 3 is the computer device such as the server or the like, and executes the program written using the thread library that provides the functions such as the thread generation or the like. In FIG. 3 and subsequent figures, description is given of a case, by way of example, where the information processing apparatus 100 executes a portable operating system interface (POSIX) thread. However, the thread to be executed by the information processing apparatus 100 is not limited to the POSIX thread. In the following, the POSIX thread is also referred to as pthread. For example, the information processing apparatus 100 executes the program described using a pthread library.

The information processing apparatus 100 includes an execution unit 200, a saving processing unit 220, an information transfer unit 240, an allocation unit 260, a warning unit 280, a first memory unit 300, and a second memory unit 400. Respective functions of the execution unit 200, the saving processing unit 220, the information transfer unit 240, the allocation unit 260, and the warning unit 280 are implemented, for example, by the information processing apparatus 100 executing the software such as the control program or the like. More specifically, the execution unit 200, the saving processing unit 220, the information transfer unit 240, the allocation unit 260, and the warning unit 280 are implemented by the control of the hardware with the software. Note that the execution unit 200, the saving processing unit 220, the information transfer unit 240, the allocation unit 260, and the warning unit 280 may be implemented only by the hardware. In addition, for example, the first memory unit 300 is the semiconductor storage such as the DRAM, and the second memory unit 400 is the hard disk device, the SSD, or the like.

The execution unit 200, the saving processing unit 220, and the information transfer unit 240 are identical or similar to the execution unit 20, the saving processing unit 22, and the information transfer unit 24 which are illustrated in FIG. 1. Thus, in FIG. 3, description is mainly given of operations of the allocation unit 260 and the warning unit 280. Before description is given of the operations of the allocation unit 260 and the warning unit 280, description is given of information to be stored in the first memory unit 300.

The first memory unit 300 stores, for example, an array of management structures TDA, an array of stacks TSA, an array of generation numbers TGA, an unallocated queue FIDXQ, and a circulation list CLST. Thread indices, for example, are used as indices for the array of the management structures TDA, the array of the stacks TSA, and the array of the generation numbers TGA. Note that the thread indices are each an example of an index to identify the thread information SINF stored in the first memory unit.

Information such as thread context and a thread return value is stored in the array of the management structures TDA, and information such as data to be used in a thread is stored in the array of the stacks TSA. Note that the information stored in the array of the management structures TDA and the information stored in the array of the stacks TSA are each an example of the thread information SINF used in the thread execution.

In the array of the generation numbers TGA are stored the generation numbers for the indices to mutually identify a same thread. Note that the generation numbers are each an example of discrimination information for discriminating the thread information SINF stored in the first memory unit 300 from thread information SINF to be saved in the second memory unit 400.

Figure 5:
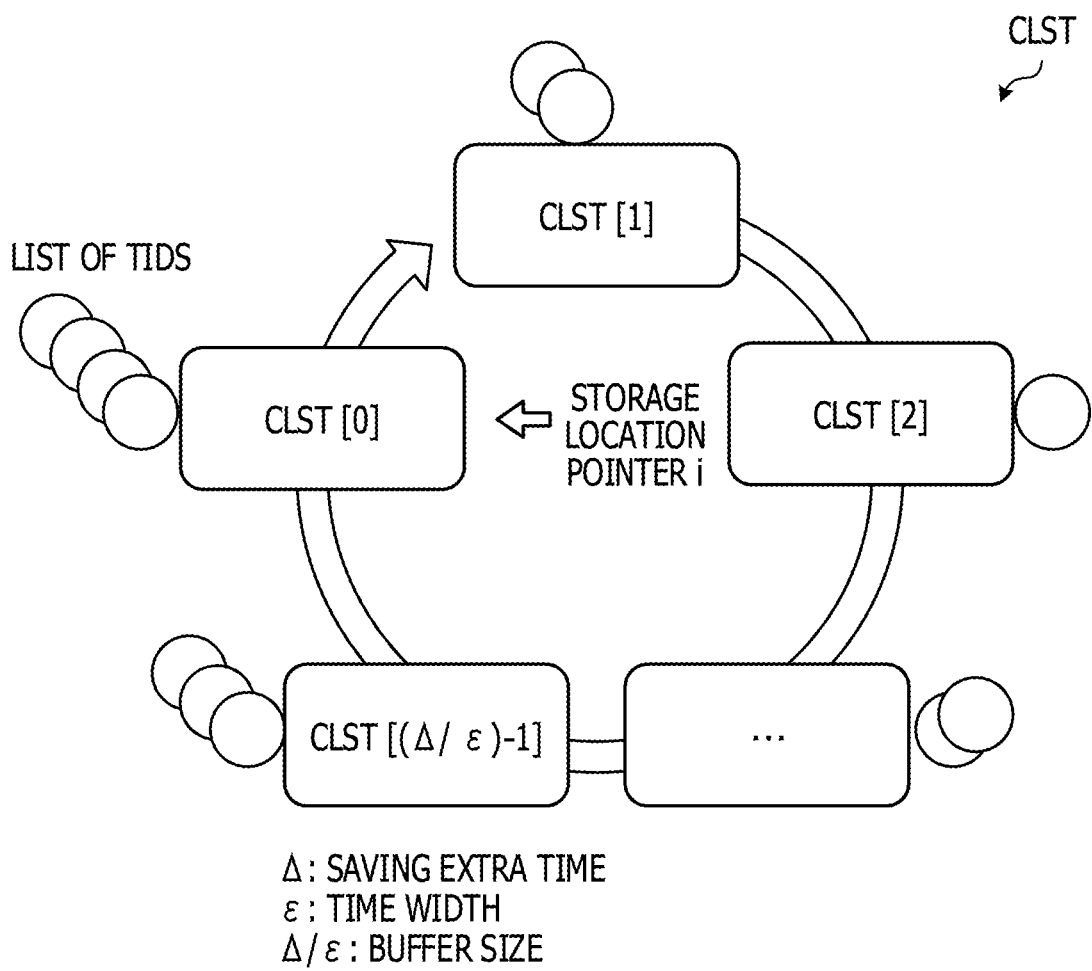
FIG. 5 is a diagram illustrating an example of a circulation list.

In the unallocated queue FIDXQ are stored unallocated indices of the indices for the arrays TDA and TSA. The unallocated indices are indices indicating the elements of the arrays TDA and TSA that are not allocated to the thread, that is, the indices of the available thread. In the unallocated queue FIDXQ, the unallocated indices are arranged without overlapping and without being missed. The circulation list CLST is used in determining the saving target thread. FIG. 5 illustrates details of the circulation list CLST.

In the information processing apparatus 100, for example, before the execution unit 200 starts to execute a new thread, the allocation unit 260 allocates a thread resource to the new thread. The thread resource is, for example, a memory area to store the array of the management structures TDA and the array of the stacks TSA.

For example, the execution unit 200 calls pthread_create from the pthread library based on the instruction to generate the new thread, pthread_create being a function to generate a thread. Then, the execution unit 200 requests the allocation unit 260 to allocate the resource such as the memory area to store the thread information SINF.

Every time pthread_create is called, the allocation unit 260 judges whether or not the first memory unit 300 has an empty area to store the thread information SINF of the new thread. For example, if the index of the available thread is stored in the unallocated queue FIDXQ, the allocation unit 260 judges that the first memory unit 300 has the empty area. In this manner, the allocation unit 260 judges based on the instruction to generate the new thread whether or not the first memory unit 300 has the empty area to store the thread information SINF of the new thread. Then, if the first memory unit 300 has the empty area, the allocation unit 260 allocates the empty area to the new thread.

For example, if the index of the available thread is stored in the unallocated queue FIDXQ, the allocation unit 260 acquires the index of the available thread from the unallocated queue FIDXQ. Then, the allocation unit 260 allocates to the new thread the element (empty area) indicated by the index acquired from the unallocated queue FIDXQ, of the elements of the arrays TDA and TSA.

In addition, every time a new thread is generated, the allocation unit 260 generates identification information TID for identifying the thread, by using the index and the generation number of the thread, and notifies the execution unit 200 of the generated identification information TID. Note that the identification information TID is information referred to as a thread ID in pthread. In the following, the thread ID is also simply referred to as TID.

In this manner, if the resource is successfully allocated to the new thread, the execution unit 200 receives the TID of the new thread from the allocation unit 260. Then, the execution unit 200 stores the TID of the new thread received from the allocation unit 260 in an area specified by an argument of pthread_create. Note that the allocation unit 260 may store the TID of the new thread in the area specified by the argument of pthread_create.

In addition, the execution unit 200 has a scheduler and a run queue, which are not illustrated, and sequentially executes the threads of the indices stored in the run queue. For example, the scheduler, which the execution unit 200 has, stores in the run queue the index of the new thread received from the allocation unit 260. Note that the execution unit 200 may extract the index of the thread from the TID of the new thread received from the allocation unit 260, notify the scheduler of the index of the extracted new thread, and store the extracted new thread in the run queue.

Note that if the index of the available thread is not stored in the unallocated queue FIDXQ, the new thread is not executed because the allocation of the resource to the new thread fails.

Here, the POSIX thread (pthread) has two states: a joinable state in which the thread is enabled to pass the thread return value another thread after the thread terminates and a detached state in which the thread is disabled from passing the thread return value to any thread after the thread terminates. While the thread is being executed, the two states, that is, the joinable state and the detached state may be changed from one state to the other state at any given time.

For example, in the thread in the joinable state, if there is any thread waiting for joining, the return value is passed to the thread waiting for joining as the processing of the thread in the joinable state terminates, and the resource of the thread in the memory area where the thread information SINF is stored is freed. Note that if there is no thread waiting for joining, the thread information SINF including the return value or the like of the thread that terminates in the joinable state is stored in the arrays TDA and TSA stored in the first memory unit 300, till the thread information SINF is used in other thread or till the predetermined period of time elapses. In addition, in the thread in the detached state, the thread information SINF including the return value or the like is not given to the other thread, and thus, as processing of the thread in the detached state terminates, the thread resource of the memory area where the thread information SINF is stored is freed.

The saving processing unit 220 stores in the circulation list CLST the TID of the thread for which no thread waiting for joining is present, of the threads that terminate in the joinable state. The saving processing unit 220 also selects from the TIDs stored in the circulation list CLST the TID of the thread the thread information SINF of which is not used before the predetermined period of time elapses after the processing of the thread terminates, and determines the thread with the selected TID as the saving target thread. Then, the saving processing unit 220 saves the thread information SINF of the saving target thread from the first memory unit 300 to the second memory unit 400.

Data (hereinafter also referred to as a data list of the thread information SINF) including a plurality of pieces of the thread information SINF to be saved from the first memory unit 300 has, for example, a data structure such as B+ tree and is stored in the second memory unit 400. Note that in the following, although description is given of the operations of the information processing apparatus 100 with the data structure of the data list of the thread information SINF being B+ tree as an example, the data structure of the data list of the thread information SINF is not limited to the B+ tree.

If the thread being executed uses the thread information SINF of the other thread saved to the second memory unit 400, the information transfer unit 240 searches the B+ tree by using the TID of the other thread as a key. Then, the information transfer unit 240 transfers the thread information SINF of the other thread from the second memory unit 400 to the execution unit 200 based on a search result of the B+ tree.

If the thread information SINF of the saving target thread is save from the first memory unit 300 to the second memory unit 400, the warning unit 280 displays on a console or the like, which is not illustrated, likelihood that the memory leak may occur due to the saving target thread, to warn the user.

Note that a configuration of the information processing apparatus 100 is not limited to the example illustrated in FIG. 3. For example, the first memory unit 300 and the second memory unit 400 may be respectively allocated to the different memory areas of the same semiconductor storage. In this case, after making data size of the thread information SINF of the saving target thread smaller through compression or the like, the saving processing unit 220 may move the thread information SINF to the second memory unit 400. In addition, for example, the array of the generation numbers TGA, the unallocated queue FIDXQ, and the circulation list CLST may be stored in a memory separate from the first memory unit 300.

In addition, the saving processing unit 220 may determine the saving target thread without using the circulation list CLST. For example, the saving processing unit 220 may give end time (time stamp) to the TID of the thread for which no thread waiting for joining is present, of the threads that terminate in the joinable state, and register the TID in a red-black tree that uses time as the key. Then, the saving processing unit 220 may detect all TIDs having the time stamps indicating any time the predetermined period of time before the current time, according to every preset step size of the time, and determine the thread of the detected TID as the saving target thread.

Figure 4:
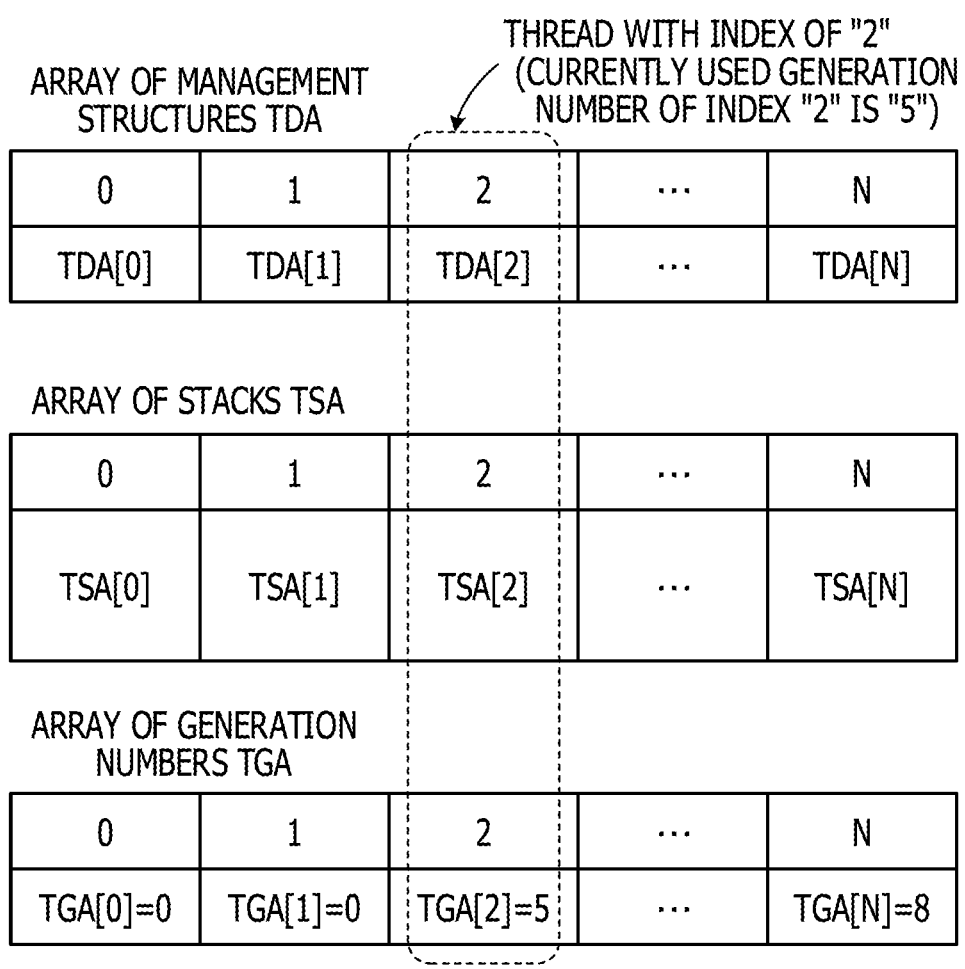
FIG. 4 is a diagram illustrating an example of a relationship of an array of management structures, an array of stacks, and an array of generation numbers illustrated in FIG. 3.

FIG. 4 illustrates an example of the relationship of the array of the management structures TDA, the array of the stacks TSA, and the array of the generation numbers TGA, which are illustrated in FIG. 3. In the example illustrated in FIG. 4, the number of elements in the respective arrays TDA, TSA, and TGA is (N+1). Note that the number of elements of the respective arrays TDA, TSA, and TGA may be fixed or may be set in a variable manner.

The array of the management structures TDA, the array of the stacks TSA, and the array of the generation numbers TGA are disposed on addresses separately from each other, the addresses indicating the memory areas in the first memory unit 300. Thus, the elements of the respective arrays TDA, TSA, and TGA are associated with each other by the index. For example, arrays TDA[2], TSA[2], and TGA[2] having the index of "2" and surrounded by a dash line in FIG. 4 are the elements to be allocated to the threads having the indices of "2". In the example illustrated in FIG. 4, the generation number of the thread currently being used and having the index of "2" is "5". Note that for example, the thread having the index of "2" and the generation number of "4" or lower is the thread the thread information SINF of which is saved from the first memory unit 300 to the second memory unit 400.

FIG. 5 illustrates an example of the circulation list CLST. Extra time Δ is an extra time till the thread information SINF is saved to the second memory unit 400 after the processing of the thread terminates, and is an example of the predetermined period of time. A time width ε is a time interval at which a storage location pointer i of the circulation list CLST is updated. In this case, the buffer size of the circulation list CLST is represented by "Δ/ε". In other words, the circulation list CLST has "Δ/ε" elements. The storage location pointer i is a global variable to be updated in the operations illustrated in FIG. 9, for example. For example, in the circulation list CLST, the TID is newly stored in the element specified by the storage location pointer i. A plurality of the TIDs (hereinafter also referred to as a TID list) stored in the respective elements of the circulation list CLST is linked by a bidirectional link list. For example, the thread information SINF of all the threads specified by the list of the TIDs stored in the elements specified by an index (=i+1) incremented by 1 from the storage location pointer i are saved from the first memory unit 300 to the second memory unit 400 at every time width ε.

Figure 6:
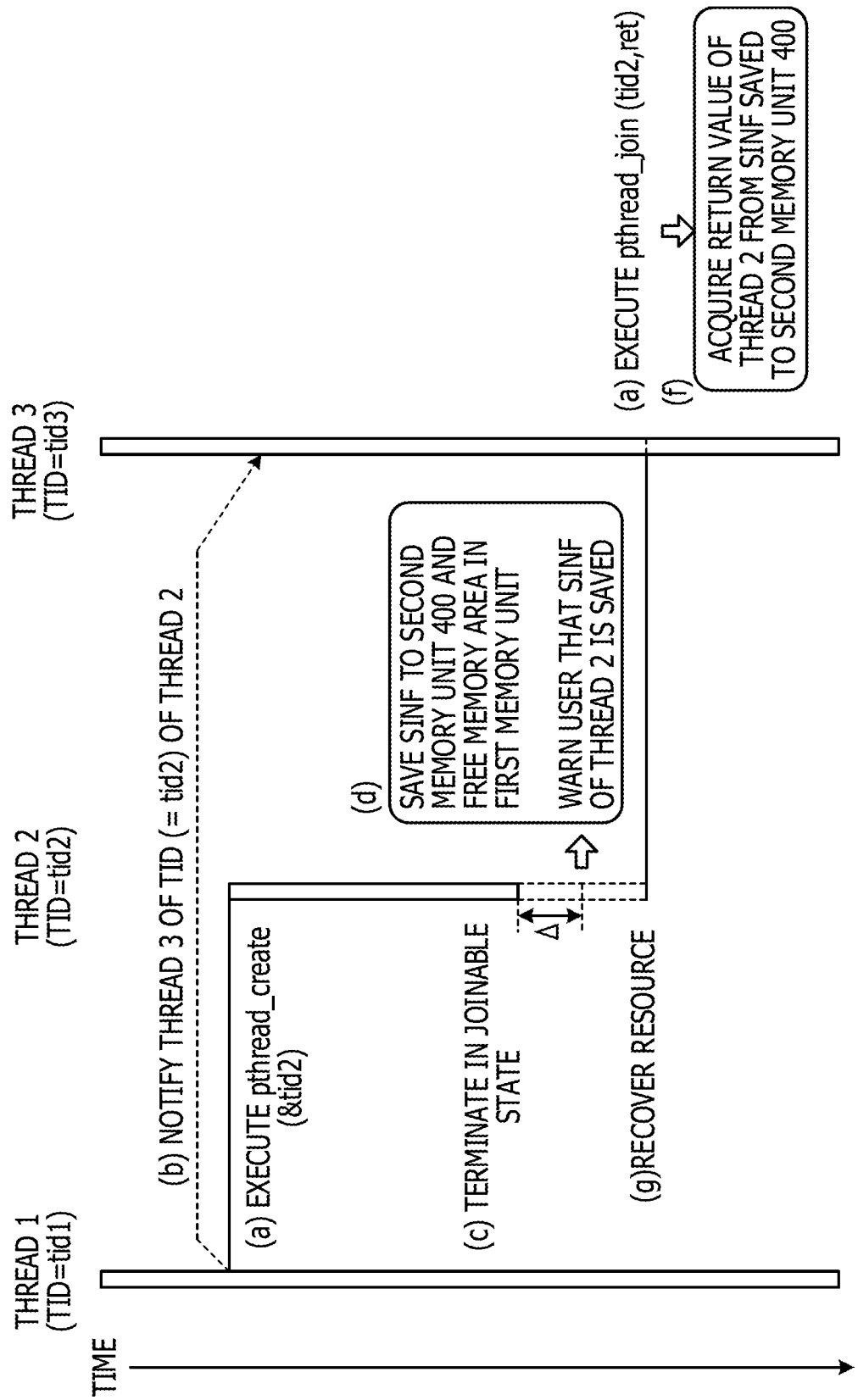
FIG. 6 is a diagram illustrating an overview of operations of the information processing apparatus illustrated in FIG. 3.

FIG. 6 illustrates an overview of the operations of the information processing apparatus 100 illustrated in FIG. 3. In the example illustrated in FIG. 6, the information processing apparatus 100 executes a thread 1 with a TID of "tid1" and a thread 3 with a TID of "tid3" in parallel. Then, the information processing apparatus 100 executes pthread_create (&tid2) in the thread 1 being executed to generate a new thread 2 ((a) of FIG. 6). With this, "tid2" is allocated as the TID of the new thread 2, and the resources such as arrays TDA [tid2] and TSA[tid2] stored in the first memory unit 300 are allocated to the thread 2. Then, the information processing apparatus 100 executes the thread 1, the thread 2, and the thread 3 in parallel. In addition, when generating the new thread 2, the information processing apparatus 100 notifies the thread 3 of the TID (=tid2) of the new thread 2 ((b) of FIG. 6).

The thread 2 terminates in the joinable state earlier than the thread 1 and the thread 3 ((c) of FIG. 6). In the example illustrated in FIG. 6, the thread information SINF of the thread 2 is not used in the other thread such as the thread 3 even when the extra time Δ elapses after the thread 2 terminates. Consequently, if the extra time Δ elapses after the thread 2 terminates, the information processing apparatus 100 saves the thread information SINF of the thread 2 from the first memory unit 300 to the second memory unit 400 ((d) of FIG. 6). This frees the memory areas (areas where the array TDA[tid2] and the array TSA[tid2] are stored) allocated to the thread 2, of the memory areas in the first memory unit 300 ((d) of FIG. 6). In addition, the information processing apparatus 100 warns the user that the thread information SINF of the thread 2 is saved to the second memory unit 400 ((d) of FIG. 6).

In addition, the information processing apparatus 100 executes pthread_join (tid2, ret) to use the thread information SINF of the thread 2, in the thread 3 being executed ((e) of FIG. 6). Note that pthread_join is a function that waits till the thread specified by the argument (the thread 2 with the TID of "tid2", for example) terminates. In addition, for example, the return value of the thread specified by the argument of pthread_join is stored in an area specified by the argument ret.

In the example of FIG. 6, the thread 2 terminates before pthread_join (tid2, ret) is executed. Consequently, when executing pthread_join (tid2, red), the information processing apparatus 100 stores the return value of the thread 2 in the area specified by the argument ret, without waiting for processing of the thread 3. More specifically, the information processing apparatus 100 acquires the return value of the thread 2 from the thread information SINF of the thread 2 saved to the second memory unit 400 ((f) of FIG. 6). This recovers the resources of the thread 2 ((g) of FIG. 6).

Figure 7:
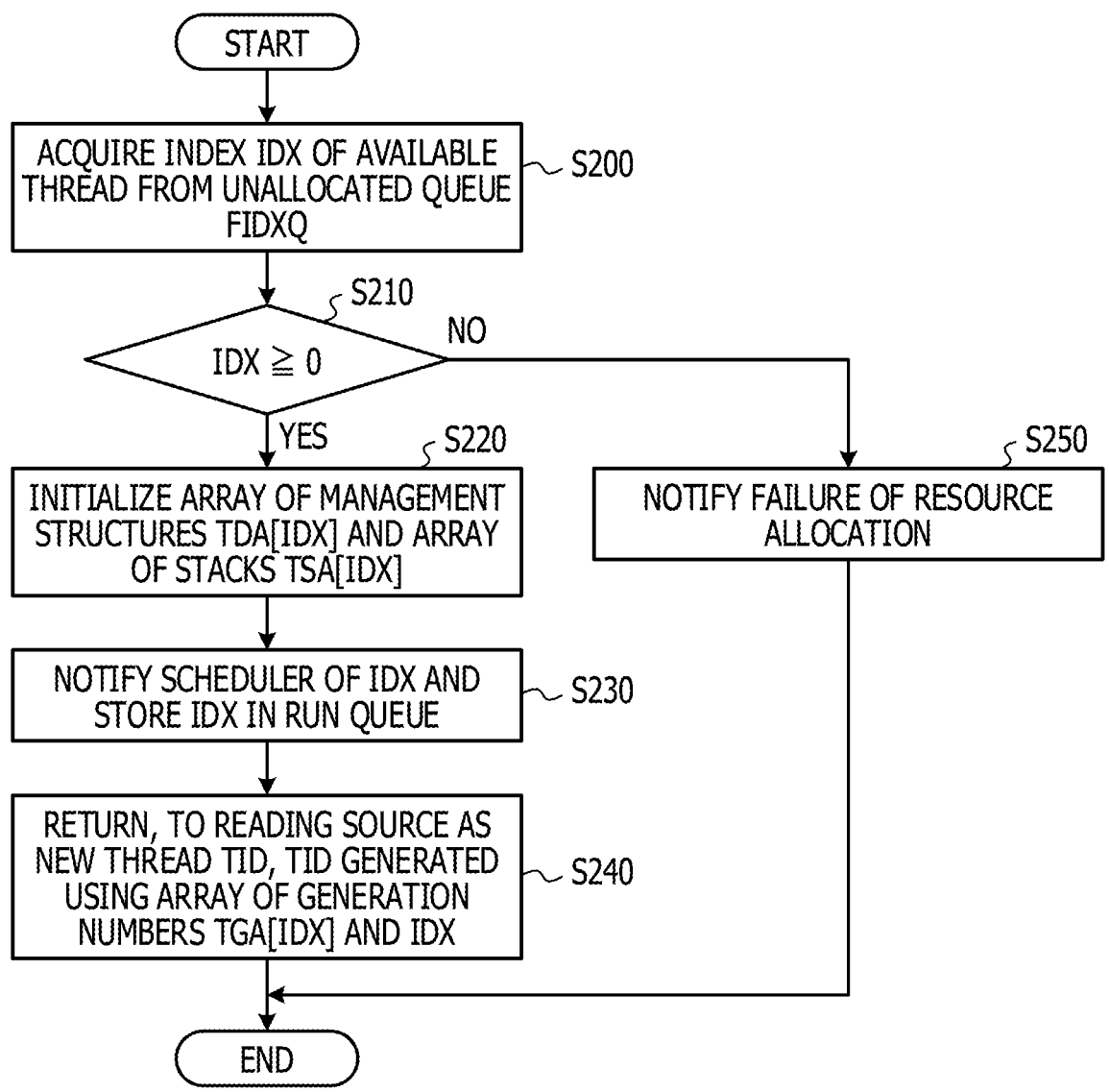
FIG. 7 is a diagram illustrating an example of the operations of the information processing apparatus if a new thread is generated.

FIG. 7 illustrates an example of the operations of the information processing apparatus 100 when generating a new thread. Note that the operations illustrated in FIG. 7 are each an aspect of the control method of the information processing apparatus and the control program of the information processing apparatus. For example, the operations illustrated in FIG. 7 may be implemented only by the hardware or may be implemented by the control of the hardware with the software such as the control program. The operations illustrated in FIG. 7 are performed, for example, every time pthread_create is called.

In step S200, the allocation unit 260 acquires an index IDX of the available thread from the unallocated queue FIDXQ. In the example illustrated in FIG. 7, if acquisition of the index IDX of the available thread fails, such as if the index IDX of the available thread is not stored in the unallocated queue FIDXQ, the index IDX having a negative value is returned to the allocation unit 260.

Then, in step S210, the allocation unit 260 judges whether or not the value of the index IDX acquired from the unallocated queue FIDXQ is "0" or larger. If the value of the index IDX acquired from the unallocated queue FIDXQ is "0" or larger, the operation of the information processing apparatus 100 proceeds to step S220. On the other hand, if the value of the index IDX is negative, that is, if the acquisition of the index IDX of the available thread fails, the operation of the information processing apparatus 100 proceeds to step S250.

In step S220, the allocation unit 260 initializes an array of management structures TDA[IDX] and an array of stacks TSA[IDX] indicated by the index IDX acquired from the unallocated queue FIDXQ.

Then, in step S230, the information processing apparatus 100 notifies the scheduler of the index IDX acquired from the unallocated queue FIDXQ and stores the index IDX in the run queue. For example, the allocation unit 260 notifies the scheduler, which the execution unit 200 has, of the index IDX acquired from the unallocated queue FIDXQ. Then, the scheduler, which the execution unit 200 has, stores the index IDX notified by the allocation unit 260, in the run queue which the execution unit 200 has.

Then, in step S240, the information processing apparatus 100 generates the TID using the array of the generation numbers TGA[IDX] indicated by the index IDX acquired from the unallocated queue FIDXQ and the index IDX. Then, the information processing apparatus 100 returns to a caller such as a program that calls pthread_create the TID generated using the array of the generation numbers TGA [IDX] and the index IDX as the TID of the new thread. For example, the information processing apparatus 100 stores the TID generated by using the array of the generation numbers TGA]IDX] and the index IDX, in the area specified by the argument of pthread_create. This terminates processing of generating the new thread. Note that as described above, in step S200, if the acquisition of the index IDX of the available thread fails, processing of step S250 is performed.

In step S250, the information processing apparatus 100 notifies the user of failure of the resource allocation and abnormally terminates the processing of generating the new thread. For example, the information processing apparatus 100 outputs a display screen to the console or the like to warn the user, the display screen indicating the failure of the resource allocation, and abnormally terminates the processing of generating the new thread.

Note that the operations of the information processing apparatus 100 in generating a new thread are not limited to the example illustrated in FIG. 7. For example, the information processing apparatus 100 may store the thread TID in place of the thread index, in the run queue, which the execution unit 200 has.

Figure 8:
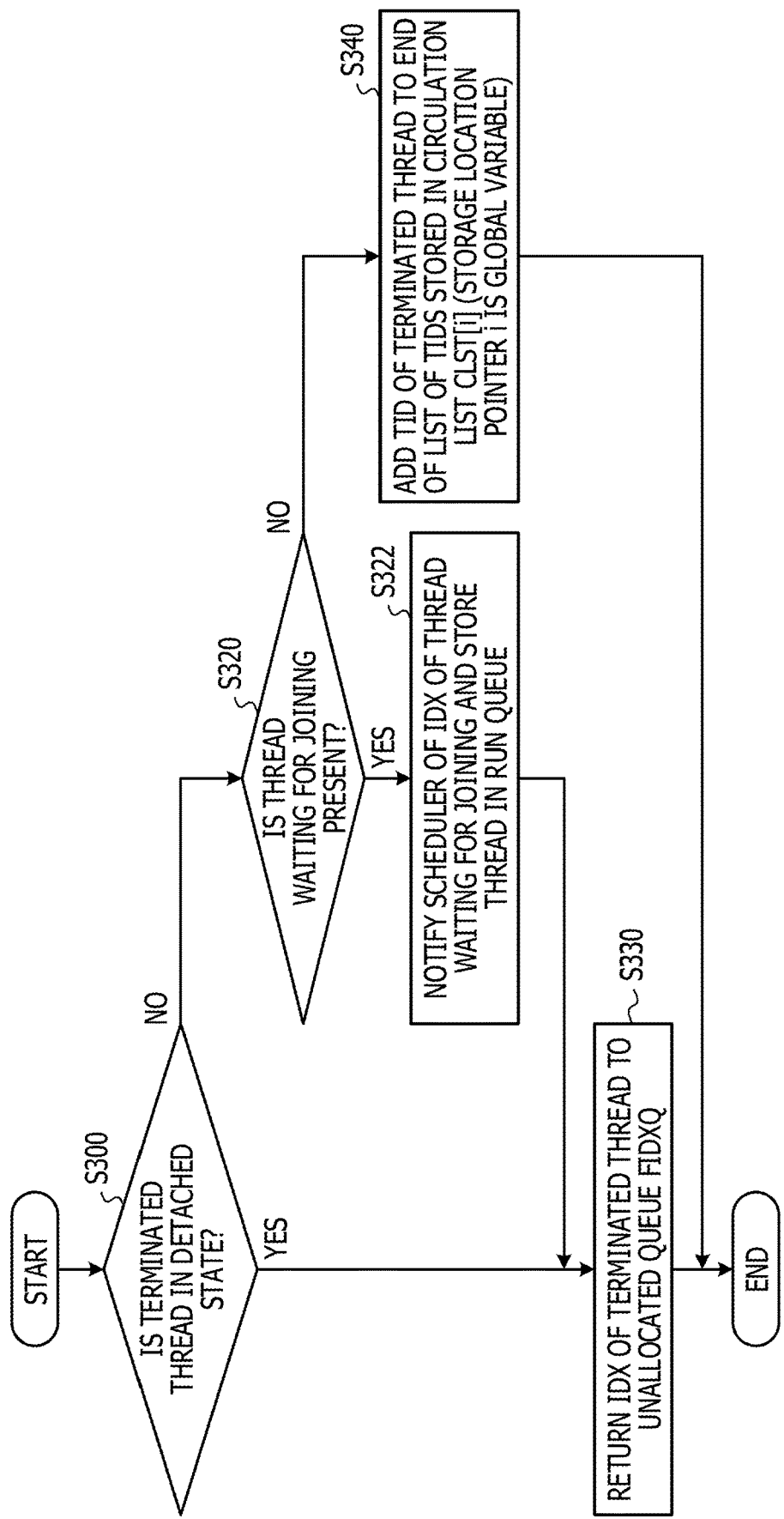
FIG. 8 is a diagram illustrating an example of the operations of the information processing apparatus if the thread terminates.

FIG. 8 illustrates an example of the operations of the information processing apparatus 100 when the thread terminates. Note that the operations illustrated in FIG. 8 are each an aspect of the control method of the information processing apparatus and the control program of the information processing apparatus. For example, the operations illustrated in FIG. 8 may be implemented only by the hardware or may be implemented by the control of the hardware with the software such as the control program. The operations illustrated in FIG. 8 are performed, for example, every time the thread terminates. Note that the termination of the thread is triggered by any of termination of a subroutine specified by pthread_create, calling of pthread_exit, abnormal termination, and execution of pthread_cancel from other thread. Note that pthread_exit is a function to terminate the thread, and pthread_cancel is a function to send a cancel request to the thread.

In step S300, the execution unit 200 judges whether or not the terminated thread is in the detached state. If the terminated thread is in the detached state, the operation of the information processing apparatus 100 proceeds to step S330. On the other hand, If the terminated thread is not in the detached state, that is, if the terminated thread is in the joinable state, the operation of the information processing apparatus 100 proceeds to step S320.

In step S320, the execution unit 200 judges whether or not there is present a thread waiting for joining, the thread waiting to use the return value of the terminated thread. If there is the thread waiting for joining, the operation of the information processing apparatus 100 proceeds to step S322.

On the other hand, if there is no thread waiting for joining, the operation of the information processing apparatus 100 proceeds to step S340.

In step S322, the information processing apparatus 100 notifies the scheduler of the index IDX of the thread waiting for joining, and stores the thread in the run queue. After the processing of step S322 is performed, the operation of the information processing apparatus 100 proceeds to step S330.

In step S330, the information processing apparatus 100 returns the index IDX of the terminated thread to the unallocated queue and terminates the processing related to the terminated thread. Note that as described above, if the terminated thread is in the joinable state and if no thread waiting for joining is present, the processing of step S340 is performed.

Figure 9:
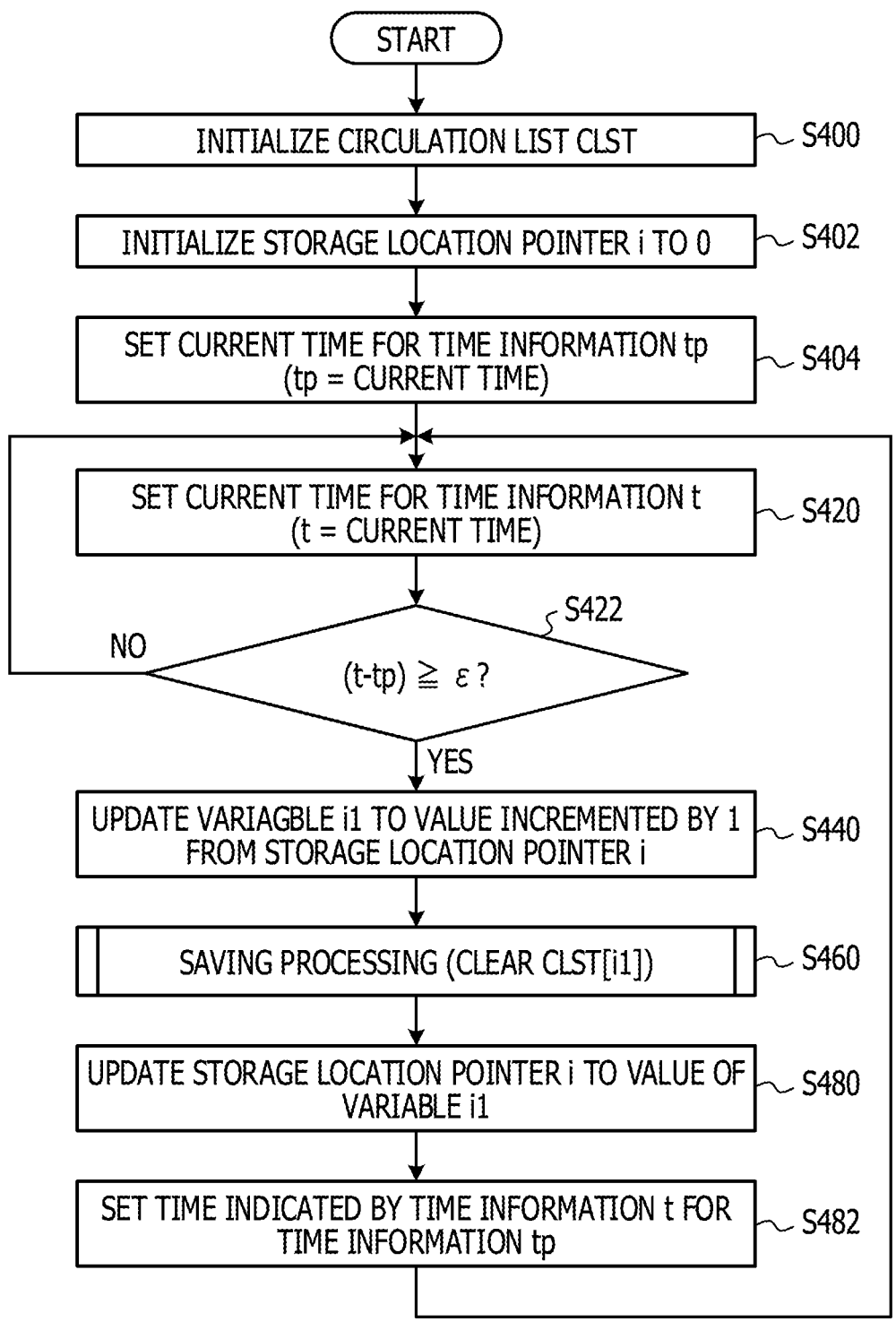
FIG. 9 is a diagram illustrating an example of the operations of the information processing apparatus if a thread resource is saved.

In step S340, the saving processing unit 220 adds the TID of the terminated thread to the end of the TID stored in a circulation list CLST[i], the circulation list CLST[i] being specified by the storage location pointer i (global variable) updated by the operations illustrated in FIG. 9. This terminates the processing related to the terminated thread.

In this manner, the saving processing unit 220 excludes, from the saving target thread, the thread for which the thread waiting for joining is present and the thread set in the detached state in which the return value of the thread is not passed to the other thread, of the threads terminated in the joinable state. Note that the operation of the information processing apparatus 100 in a case where the thread terminates is not limited to the example illustrated in FIG. 8.

FIG. 9 illustrates an example of the operations of the information processing apparatus 100 if the thread resource is saved. Note that the operations illustrated in FIG. 9 are each an aspect of the control method of the information processing apparatus and the control program of the information processing apparatus. For example, the operations illustrated in FIG. 9 may be implemented only by the hardware or may be implemented by the control of the hardware with the software such as the control program. Processing in step S400 is performed, triggered by execution of a user program written using the pthread library.

In step S400, the information processing apparatus 100 initializes the circulation list CLST. This clears all the elements in the circulation list CLST. Then, in step S402, the information processing apparatus 100 initializes the storage location pointer i to "0". Then, in step S404, the information processing apparatus 100 sets the current time for time information tp. After a series of initialization processing from step S400 to step S404 terminates, processing of step S420 is performed.

In step S420, the information processing apparatus 100 sets the current time for time information t. Then, in step S422, the information processing apparatus 100 judges whether or not a difference between the time information t and the time information tp (=t−tp) is the time width ε or longer. More specifically, the information processing apparatus 100 judges whether or not time elapses more than the time width ε from the time indicated by the time information tp. If the difference between the time information t and the time information tp (=t−tp) is the time width ε or longer, more specifically, if the time elapses longer than the time width ε from the time indicated by the time information tp, the operation of the information processing apparatus 100 proceeds to step S440. On the other hand, if the difference between the time information t and the time information tp (=t−tp) is shorter than the time width ε, the operation of the information processing apparatus 100 returns to step S420.

More specifically, the processing of step S440 is performed whenever time same or substantially same as the time width ε elapses.

In step S440, the saving processing unit 220 updates a variable i1 to a value incremented by 1 from the storage location pointer i. The variable i1 is represented by "i1=(i+1) mod (Δ/ε)", using a remainder operator mod.

Figure 10:
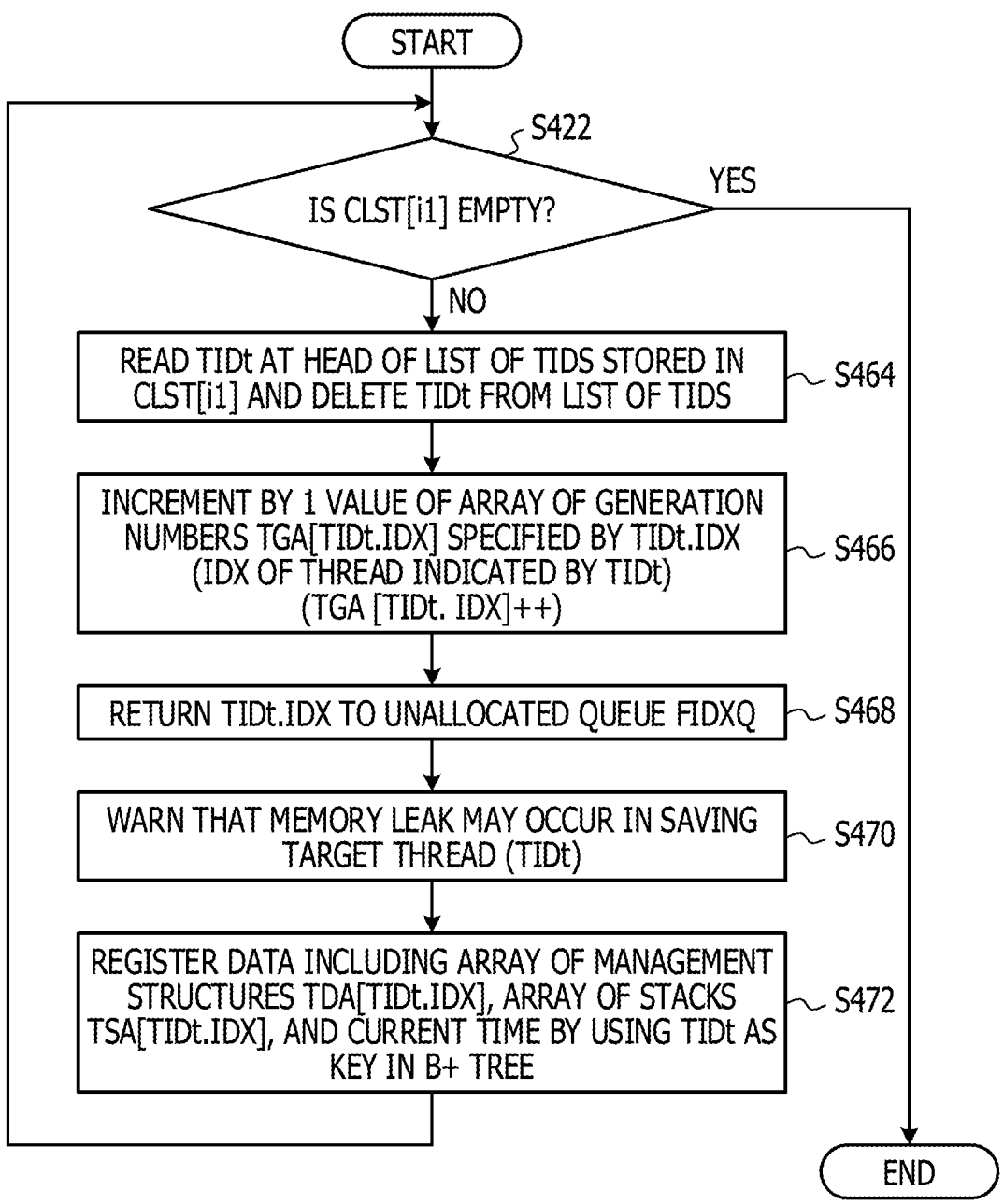
FIG. 10 is a diagram illustrating an example of saving processing illustrated in FIG. 9.

Then, in step S460, the information processing apparatus 100 performs the saving processing illustrated in FIG. 10. The saving processing saves the thread information SINF of the thread of the TID stored in a circulation list CLST[i1] specified by the variable i1 from the first memory unit 300 to the second memory unit 400 and clears the circulation list CLST[i1] specified by the variable i1.

Then, in step S480, the information processing apparatus 100 updates the storage location pointer i to the value of the variable i1 (i=i1). With this, for example, in step S340 illustrated in FIG. 8, the TID is stored in the element of the circulation list CLST cleared by the saving processing of step S460.

Then, in step S482, the information processing apparatus 100 sets the time indicated by the time information t for the time information tp (tp=t). This updates the time information tp. After the storage location pointer i and the time information tp are updated (after a series of updating processing of step S480 and step S482 terminates), the operation of the information processing apparatus 100 returns to step S420.

In this manner, the saving processing of step S460 is performed whenever time same or substantially same as the time width ε elapses. Therefore, the TID stored in the circulation list CLST[i1] cleared by the saving processing is the TID of the thread for which the extra time Δ (=the time width ε×the number of elements in the circulation list CLST (Δ/ε)) or time substantially same as the extra time Δ elapses after the processing of the thread terminates. More specifically, in the operations illustrated in FIG. 9, saving of the thread information SINF is deferred only for the extra time Δ.

With this, for example, within the extra time Δ after the thread terminates, the thread executing pthread_join on the terminated thread may read the return value from the thread information SINF stored in the first memory unit 300. If access time to the first memory unit 300 is shorter than the access time to the second memory unit 400, time taken for acquisition of the return value may be made shorter by reading of the return value from the first memory unit 300 than a case where the return value is read from the second memory unit 400. In other words, if the return value is read from the thread information SINF stored in the second memory unit 400, the time taken for acquisition of the return value increases, and a penalty for execution time increases, compared with a case where the return value is read from the first memory unit 300. Therefore, in the operations illustrated in FIG. 9, deferring the saving of the thread information SINF only for the extra time Δ makes it possible to suppress the increase of the penalty for the execution time on the thread that executes pthread_join.

In addition, the operations illustrated in FIG. 9 may make it possible to decrease the saving to the second memory unit 400 of the thread information SINF of the thread that is likely to be used in the other thread, compared with a case in which the saving of the thread information SINF is performed immediately after the thread terminates. The thread information SINF of the thread that is likely to be used in the other thread is, for example, a program bug or thread information SINF other than the thread information SINF that intentionally remains unfreed on the memory.

FIG. 10 illustrates an example of the saving processing illustrated in FIG. 9. More specifically, the processing of step S462 is performed after the variable i1 is updated by step S440 illustrated in FIG. 9. Therefore, the value of the variable i1 illustrated in FIG. 10 is the value updated by step S440 illustrated in FIG. 9.

In step S462, the saving processing unit 220 judges whether or not the circulation list CLST[i1] specified by the variable i1 is empty. If the circulation list CLST[i1] is empty, that is, if no TID is stored in the circulation list CLST[i1], the saving processing terminates, and the operation of the information processing apparatus 100 proceeds to step S480 illustrated in FIG. 9. On the other hand, if the circulation list CLST[i1] is not empty, that is, if the TID is stored in the circulation list CLST[i1], the operation of the information processing apparatus 100 proceeds to step S464.

In step S464, the saving processing unit 220 reads TIDt at the head of the list of TIDs stored in the circulation list CLST[i1] and deletes the TIDt from the list of TIDs. Note that in FIG. 10, the TID read in step S464 is referred to as TIDt with "t" added to the end of the TID, in order to distinguish the TID of the thread targeted for the series of processing from step S466 to step S472 from the TID of the other thread. In addition, in the following, the index IDX of the thread indicated by the TIDt is referred to as TIDt.IDX, and the generation number of the thread indicated by the TIDt is referred to as TIDt.GEN.

Then, in step S466, the saving processing unit 220 increases a value of an array of generation numbers TGA[TIDt.IDX] specified by TIDt.IDX by "1" (TGA[TIDt.IDX]++). This updates the value of the array of the generation numbers TGA[TIDt.IDX] to a generation number which is 1 larger than TIDt.GEN. As a result, for example, even if the index IDX of the thread the thread information SINF of which is saved to the second memory unit 400 is reused, uniqueness of the TID may be ensured.

Then, in step S468, the saving processing unit 220 returns TIDt.IDX to the unallocated queue FIDXQ. This frees the resources allocated to the thread of the TIDt (array TDA[TIDt.IDX], array TSA[TIDt.IDX], or the like).

Then, in step S470, the warning unit 280 warns that the memory leak may occur in the saving target thread (thread of TIDt). For example, the saving processing unit 220 notifies the warning unit 280 of the TIDt. Then, the warning unit 280 outputs the display screen to the console or the like, the display screen indicating that the memory leak may occur in the saving target thread (thread of the TIDt).

Then, in step S472, the saving processing unit 220 registers data including the array of the management structures TDA[TIDt.IDX], the array of the stacks TSA[TIDt.IDX], and the current time by using the TIDt as the key in the B+ tree. This saves the thread information SINF from the first memory unit 300 to the second memory unit 400, the thread information SINF including the array of the management structures TDA[TIDt.IDX] and the array of the stacks TSA[TIDt.IDX]. Note that the current time included in the data registered in the B+ tree indicates saving time when the thread information SINF is saved from the first memory unit 300 to the second memory unit 400. The current time indicating the saving time may be omitted from the data registered in the B+ tree. In addition, because the execution of the thread of the TIDt is not resumed, the data registered in the B+ tree may be information thinned from the thread information SINF including the array of the management structures TDA[TIDt.IDX] and the array of the stacks TSA

[TIDt.IDX]. After the processing of step S472 is performed, the operation of the information processing apparatus 100 returns to step S462.

In this manner, the saving processing unit 220 determines for the saving target thread the thread of the TID stored in the circulation list CLST[i1] specified by the variable i1, the variable i1 being updated in step S440 illustrated in FIG. 9. Note that the operations of the information processing apparatus 100 in saving the thread resource are not limited to the examples illustrated in FIGS. 9 and 10.

Figure 11:
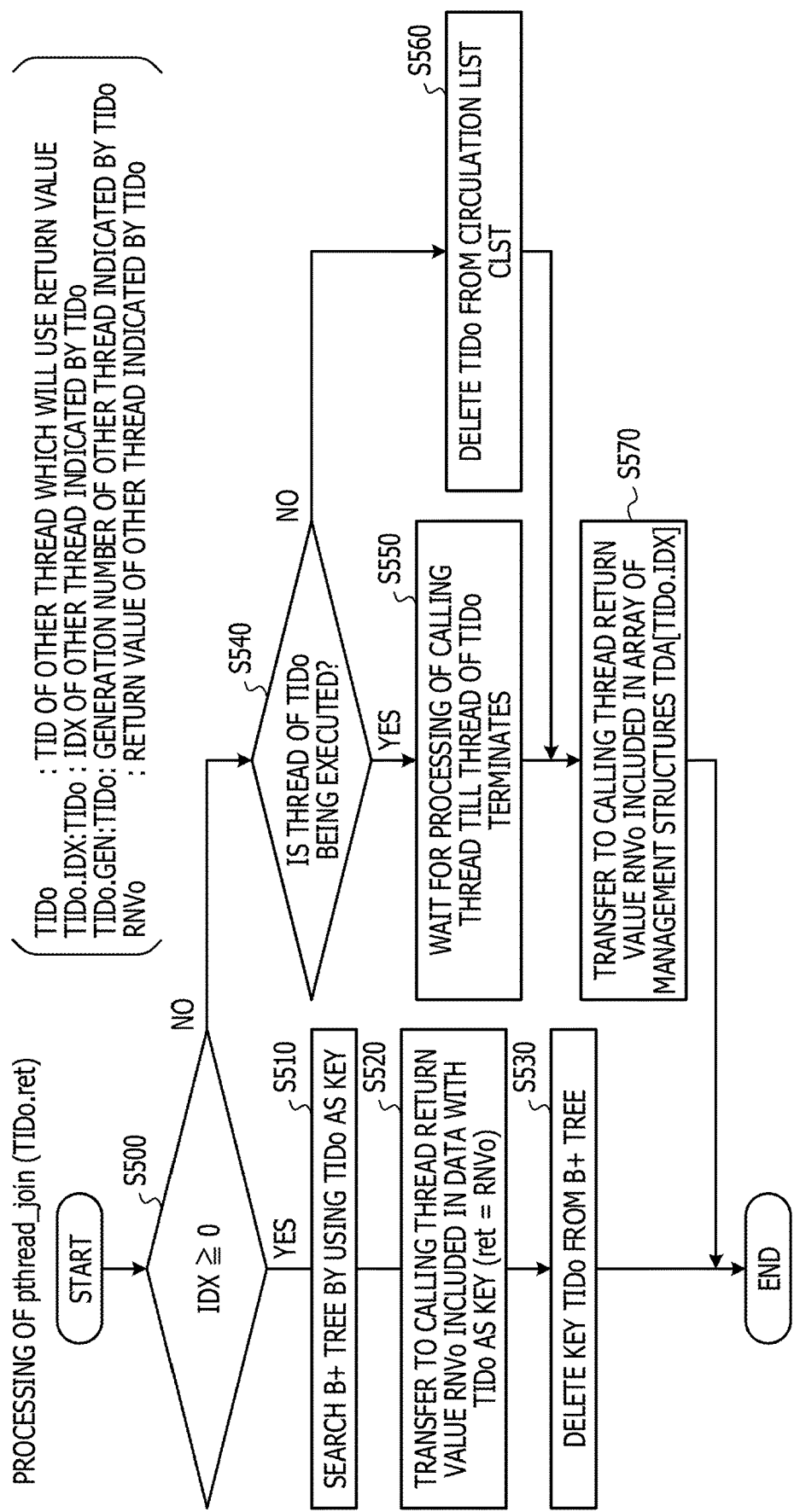
FIG. 11 is a diagram illustrating an example of the operations of the information processing apparatus if a return value of other thread is used.

FIG. 11 illustrates an example of the operations of the information processing apparatus 100 in using the return value of the other thread. Note that the operations illustrated in FIG. 11 are each an aspect of the control method of the information processing apparatus and the control program of the information processing apparatus. For example, the operations illustrated in FIG. 11 may be implemented only by the hardware or may be implemented by the control of the hardware with the software sch as the control program. The operations illustrated in FIG. 11 are performed, for example, every time pthread_join is called. In the example illustrated in FIG. 11, the information processing apparatus 100 stores the return value of the thread of TIDo (return value of the other thread) in the area specified by the argument ret of the pthread_join. In addition, in FIG. 11, the index IDX of the thread indicated by the TIDo is referred to as TIDo.IDX and the generation number of the thread indicated by the TIDo is referred to as TIDo.GEN.

In step S500, the execution unit 200 judges whether or not TIDo.GEN is smaller than an array of generation numbers TGA[TIDo.IDX]. More specifically, the execution unit 200 judges whether or not TIDo.GEN is smaller than the currently used generation number. TIDo.GEN smaller than the array of the generation numbers TGA[TIDo.IDX] indicates that the thread information SINF of the thread of TIDo is saved to the second memory unit 400. In addition, TIDo.GEN having a same value as the array of the generation numbers TGA[TIDo.IDX] indicates that the thread information SINF of the thread of the TIDo is not saved to the second memory unit 400. If TIDo.GEN is smaller than the array of the generation numbers TGA[TIDo.IDX], the operation of the information processing apparatus 100 proceeds to S510. On the other hand, if TIDo.GEN is the array of the generation numbers TGA[TIDo.IDX] or larger, the operation of the information processing apparatus 100 proceeds to step S540.

In step S510, the information transfer unit 240 searches the B+ tree by using the TIDo as a key. For example, the execution unit 200 requests the information transfer unit 240 to acquire the return value of the thread of the TIDo by notifying the information transfer unit 240 of the TIDo. Then, the information transfer unit 240 searches the B+ tree by using the TIDo notified by the execution unit 200 as the key.

Then, in step S520, the information transfer unit 240 transfers a return value RNVo included in the data with the TIDo as the key (data retrieved in step S510), to the calling thread (thread that calls pthread_join). For example, the information transfer unit 240 stores the return value RNVo included in the data by using the TIDo as the key in an area specified by the argument ret of pthread_join (ret=RNVo). This allows the execution unit 200 to acquire the return value RNVo of the thread of the TIDo from the area specified by the argument ret of pthread_join. Note that the information transfer unit 240 may notify the execution unit 200 of the return value RNVo. In this case, the execution unit 200 may store the return value RNVo notified by the information transfer unit 240 in the area specified by the argument ret of pthread_join.

Then, in step S530, the information transfer unit 240 deletes the key TIDo from the B+ tree. This frees the resource of the thread of the TIDo from the second memory unit 400, and the processing in a case where the thread information SINF of the thread of the TIDo is saved in the second memory unit 400 terminates. Note that as described above, if the thread information SINF of the thread TIDo is not saved in the second memory unit 400, processing of step S540 is performed.

In step S540, the execution unit 200 judges whether or not the thread of the TIDo (other thread) is being executed. If the thread of the TIDo is being executed, the operation of the information processing apparatus 100 proceeds to step S550. On the other hand, if the thread of the TIDo is not being executed, the operation of the information processing apparatus 100 proceeds to step S560. More specifically, if the thread of the TIDo terminates and if the thread information SINF of the thread of the TIDo is stored in the first memory unit 300, the operation of the information processing apparatus 100 proceeds to step S560.

In step S550, the execution unit 200 waits for the processing of the calling thread (thread that calls pthread_join) till the thread of the TIDo terminates. If the processing of the thread of the TIDo terminates, the operation of the information processing apparatus 100 proceeds to step S570.

In step S560, the saving processing unit 220 deletes the TIDo from the circulation list CLST. This excludes the thread of the TIDo from the saving target thread. In this manner, it is possible to decrease the saving of the program bug or thread information SINF (thread information SINF used in the other thread) other than the thread information SINF that intentionally remains unfreed on the memory. After the processing of step S560 is performed, the operation of the information processing apparatus 100 proceeds to step S570.

In step S570, the information processing apparatus 100 transfers the return value RNVo included in the array of the management structures TDA[TIDo.IDX] to the calling thread (thread that calls pthread_join). For example, the information processing apparatus 100 stores the return value RNVo included in the array of the management structures TDA[TIDo.IDX] in the area specified by the argument ret of pthread_join (ret=RNVo). This frees the resource of the thread of TIDo from the first memory unit 300, and the processing in a case where the thread information SINF of the thread of TIDo is not saved in the second memory unit 400 terminates.

Note that the operation of the information processing apparatus 100 if the return value of the other thread is used is not limited to the example illustrated in FIG. 11. For example, step S530 may be omitted. In this case, for example, when the user performs the program analysis or the like, it is possible to access the thread information SINF saved to the second memory unit 400 after the thread terminates.

As described above, in the embodiment illustrated in FIGS. 3 to 11, the information processing apparatus 100 includes the first memory unit 300 and the second memory unit 400, the first memory unit 300 configured to store the thread information SINF to be used for the thread execution, and the second memory unit 400 configured to store the thread information SINF saved from the first memory unit 300. Furthermore, the information processing apparatus 100 includes the execution unit 200 configured to execute the thread, the saving processing unit 220, the information transfer unit 240, the allocation unit 260, and the warning unit 280. Of the threads to be executed by the execution unit 200, the saving processing unit 220 saves the thread information SINF of the saving target thread the thread information SINF of which is saved, from the first memory unit 300 to the second memory unit 400 after the saving target thread terminates. This makes it possible to free the memory area in the first memory unit 300 allocated to the saving target thread and suppress the occurrence of the memory leak.

In addition, for example, the saving processing unit 220 defers the saving of the thread information SINF only for the extra time Δ. In this case, the increase in the penalty for the execution time on the thread that uses the thread information SINF of the other thread may be suppressed, compared with a case where the saving of the thread information SINF is performed immediately after the thread terminates. Moreover, it is possible to decrease the saving of the program bug or thread information SINF (thread information SINF used in the other thread) other than the thread information SINF that intentionally remains unfreed on the memory.

In addition, if the thread being executed uses the thread information SINF saved in the second memory unit 400, the information transfer unit 240 transfers the thread information SINF to be used by the thread being executed, from the second memory unit 400 to the execution unit 200. With this, even if the thread information SINF saved from the first memory unit 300 to the second memory unit 400 is used in the following thread, the thread information SINF may be transferred to the following thread.

As a result, abnormal termination of the following thread without being able to use the thread information SINF may be avoided.

In addition, if the resource is allocated to a new thread, the allocation unit 260 generates the identification information TID for identifying the thread by using the index and the generation number of the thread and notifies the execution unit 200 of the generated identification information TID. This allows the information processing apparatus 100 to ensure the uniqueness of the TID even if the index IDX of the thread the thread information SINF of which is saved in the second memory unit 400 is reused.

Figure 12:
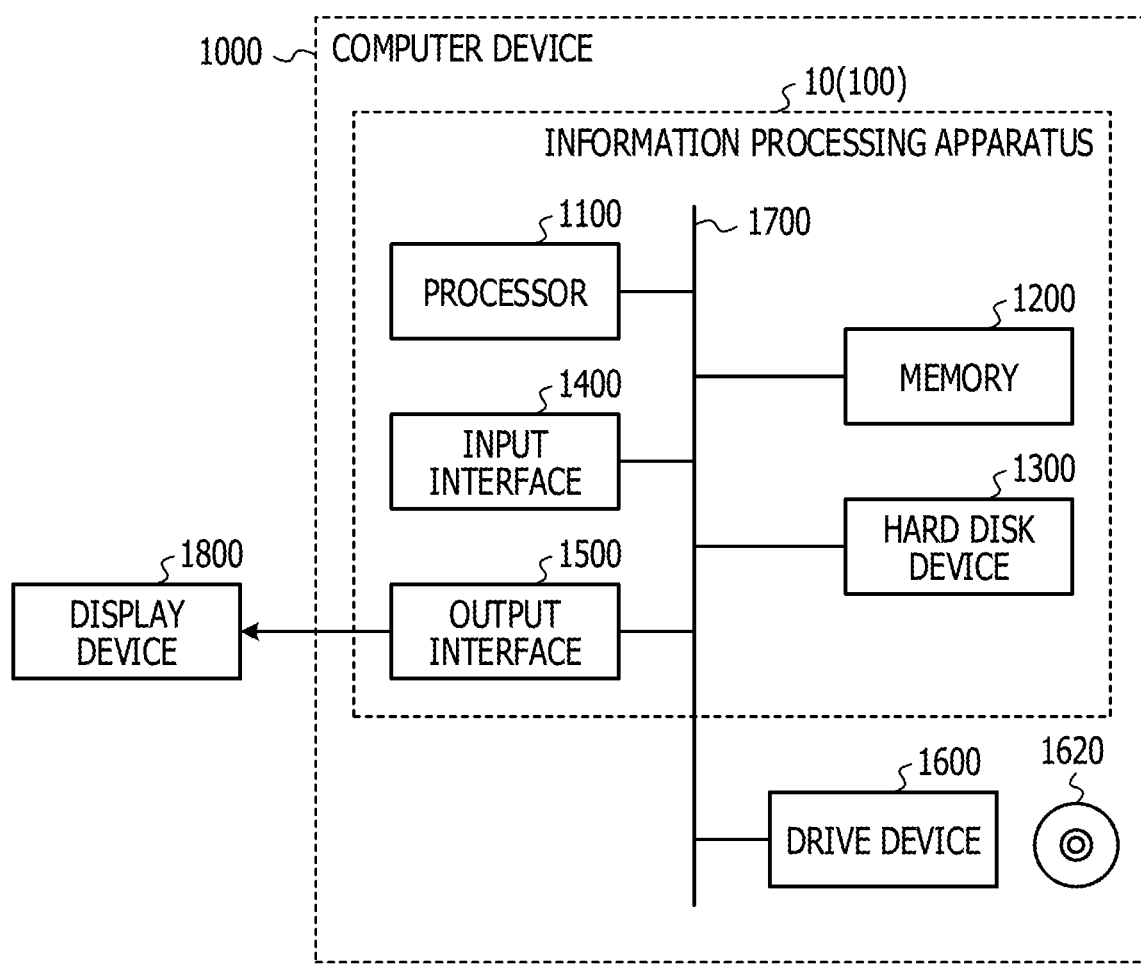
FIG. 12 is a diagram illustrating an example of hardware that executes a control program of the information processing apparatus.

FIG. 12 illustrates an example of the hardware executing the control program of the information processing apparatus. Note that the elements identical or similar to the elements described in FIGS. 1 to 11 are assigned the identical or similar reference numerals and a detailed description of the elements is omitted. For example, a computer device 1000 implements the functions of the information processing apparatus 10 and 100 illustrated in FIGS. 1 and 3, by executing the control program of the information processing apparatus.

The computer device 1000 includes, for example, a processor 1100, a memory 1200, a hard disk device 1300, an input interface 1400, an output interface 1500, and a drive device 1600. The processor 1100, the memory 1200, the hard disk drive 1300, the input interface 1400, the output interface 1500, and the drive device 1600 are connected to a bus 1700. The functions of the information processing apparatus 10, 100 or the like are implemented by, for example, the processor 1100, the memory 1200, the hard disk device 1300, the input interface 1400, and the output interface 1500.

A removable medium 1620 may be mounted to the drive device 1600, the drive device 1600 performing reading and recording of information recorded in the mounted removable medium 1620. The removable medium 1620 may be, for example, a compact disk read only memory (CD-ROM), a digital versatile disk (DVD), a Universal Serial Bus (USB) memory, or the like.

In addition, the computer device 1000 communicates with outside of the computer device 1000 via the input interface 1400 and the output interface 1500. For example, the input interface 1400 is connected to an input device, which is not illustrated, such as a keyboard, a mouse, or the like. The output interface 1500 is connected to a display device 1800, for example, and outputs to the display device 1800 the display screen such as a warning indicating that the memory leak may occur.

The memory 1200 stores an operating system of the computer device 1000, the control program of the information processing apparatus, or the like. The memory 1200 may also store the thread information SINF such as the array of the management structures TDA, the array of the stacks TSA, or the like. Then, the hard disk device 1300 may store the thread information SINF saved from the memory 1200.

The software such as the control program of the information processing apparatus may be recorded in the removable medium 1620 which may then be distributed. For example, the computer device 1000 may read the software such as the control program of the information processing apparatus from the removable medium 1620 via the drive device 1600, and store the software in the memory 1200 or the hard disk drive 1300. More specifically, the removable medium 1620 is an example of a recording medium that records the control program of the information processing apparatus and is readable by a computer.

The computer device 1000 may also download the software such as the control program of the information processing apparatus via a communication device (not illustrated) connected to a network such as Internet and store the software in the memory 1200 or the hard disk drive 1300.

Note that the hardware configured to execute the control program of the information processing apparatus is not limited to the example illustrated in FIG. 12. For example, in the computer device 1000, the drive device 1600 may be omitted. In addition, for example, the computer device 1000 may include a solid state drive (SSD) in place of the hard disk device 1300.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
    a first memory configured to store thread information to be used in thread execution;
    a second memory configured to store the thread information saved from the first memory; and
    a processor configured to
    execute an execution processing that includes executing a thread,
    execute a saving processing that includes saving the thread information of a saving target thread from the first memory to the second memory after execution of the saving target thread completes, the saving target thread being any of threads to be executed by the execution processing,
execute an information transfer processing that includes transferring, in response to executing an execution target thread, the thread information of the saving target thread from the second memory to the execution processing, the execution target thread being a thread other than the saving target thread corresponding to the transferred thread information, and
execute allocation processing that includes
judging based on an instruction to generate a new thread whether the first memory has an empty area to store the thread information of the new thread, and
allocating, in response that the first memory has the empty area, the empty area to the thread information of the new thread,
the allocation processing is configured to
generate identification information to identify the new thread in response that the new thread is generated, by using a first index and discrimination information, the first index being an index for identifying the thread information stored in the first memory, the discrimination information being information for discriminating the thread information stored in the first memory from the thread information saved to the second memory, and
notify the execution processing of the generated identification information.

2. The information processing apparatus according to claim 1, wherein the saving processing is configured to determine, as the saving target thread, a first thread the thread information of which is not used before a predetermined period of time elapses after processing of the first thread is terminated.

3. The information processing apparatus according to claim 2, wherein the saving processing is configured to exclude from the saving target thread a second thread that does not pass a return value of the second thread to another thread.

4. The information processing apparatus according to claim 1, wherein the saving processing is configured to determine the saving target thread from among the threads by using a type of a function to be executed first in each of the threads.

5. The information processing apparatus according to claim 1, wherein the saving processing is configured to determine the saving target thread from among the threads by using an address that indicates a storage location of an instruction to generate each of the threads.

6. The information processing apparatus according to claim 1, wherein the saving processing is configured to determine, as the saving target thread, a third thread having thread attributes including such an attribute that the thread information is to be saved after the processing of the third thread is terminated.

7. A control method of information processing implemented by a computer having a first memory configured to store thread information to be used in thread execution and a second memory configured to store the thread information saved from the first memory, the method comprising:
executing an execution processing that includes executing a thread;
executing a saving processing that includes saving the thread information of a saving target thread from the first memory to the second memory after execution of the saving target thread completes, the saving target thread being any of threads to be executed by the execution processing;
executing an information transfer processing that includes transferring, in response to executing an execution target thread, the thread information of the saving target thread from the second memory to the execution processing, the execution target thread being a thread other than the saving target thread corresponding to the transferred thread information, and
executing allocation processing that includes
judging based on an instruction to generate a new thread whether the first memory has an empty area to store the thread information of the new thread, and
allocating, in response that the first memory has the empty area, the empty area to the thread information of the new thread,
the allocation processing is configured to
generate identification information to identify the new thread in response that the new thread is generated, by using a first index and discrimination information, the first index being an index for identifying the thread information stored in the first memory, the discrimination information being information for discriminating the thread information stored in the first memory from the thread information saved to the second memory, and
notify the execution processing of the generated identification information.

8. A non-transitory computer-readable storage medium for storing a program which causes a computer to perform a processing, the computer having a first memory configured to store thread information to be used in thread execution and a second memory configured to store the thread information saved from the first memory, the processing comprising:
executing an execution processing that includes executing a thread;
executing a saving processing that includes saving the thread information of a saving target thread from the first memory to the second memory after execution of the saving target thread completes, the saving target thread being any of threads to be executed by the execution processing;
executing an information transfer processing that includes transferring, in response to executing an execution target thread, the thread information of the saving target thread from the second memory to the execution processing, the execution target thread being a thread other than the saving target thread corresponding to the transferred thread information, and
executing allocation processing that includes
judging based on an instruction to generate a new thread whether the first memory has an empty area to store the thread information of the new thread, and
allocating, in response that the first memory has the empty area, the empty area to the thread information of the new thread,
the allocation processing is configured to
generate identification information to identify the new thread in response that the new thread is generated, by using a first index and discrimination information, the first index being an index for identifying the thread information stored in the first memory, the discrimination information being information for discriminating the thread information stored in the first memory from the thread information saved to the second memory, and notify the execution processing of the generated identification information.

\* \* \* \* \*